Aug. 29, 1967 N. H. BOGIE 3,338,595
TRAILER STABILIZER
Filed Oct. 23, 1965 2 Sheets-Sheet 1

INVENTOR:
NELSON HARVEY BOGIE
BY
Harrington A. Lackey
ATTORNEY

INVENTOR:
NELSON HARVEY BOGIE
BY,
Harrington A. Lackey
ATTORNEY

United States Patent Office 3,338,595
Patented Aug. 29, 1967

3,338,595
TRAILER STABILIZER
Nelson H. Bogie, Gilbertsville, Ky. 42044
Filed Oct. 23, 1965, Ser. No. 503,263
4 Claims. (Cl. 280—446)

ABSTRACT OF THE DISCLOSURE

A trailer stabilizer including a flexible cable, the free ends of which are attached to the tractor vehicle, a cable support mounted on the trailer vehicle including a spool about which the intermediate portion of the cable is wound, and guide means mounted on the cable support to guide the intermediate portion of the cable from the spool in substantially forward directions along opposite sides of the vehicles toward the tractor vehicle.

---

This invention relates to a trailer stabilizer, and more particularly to a device for stabilizing a trailer drawn by a tractor vehicle, as well as permitting turning of the tractor vehicle relative to the trailer.

In the conventional tractor vehicle-trailer tandem, and particularly automobiles and house or boat trailers, the trailers are coupled to the back of the vehicle by a single trailer hitch. Although the trailer hitch permits free turning movement of the tractor vehicle relative to the trailer, by the same token, the trailer hitch permits undesired lateral pivoting or whipping for minor turning movements of the tractor vehicle when moving on a predominantly straight course. Moreover, because of the proximity of the pivot point of the trailer hitch to the rear wheels of the tractor vehicle as opposed to the remoteness of the trailer hitch from the trailer wheels, the turning or pivotal movements of the tractor vehicle are magnified in the trailer vehicle. Consequently, the lateral instability of conventional trailers is not only undesirable but can become dangerous in motor traffic.

It is therefore an object of this invention to overcome this undesirable lateral instability between a tractor vehicle and a trailer by providing a stabilizer device connecting the trailer to the tractor vehicle as a supplement to the conventional trailer hitch.

Another object of this invention is to provide a trailer stabilizer which will not only substantially reduce unwanted horizontal pivotal movement of the trailer relative to the tractor vehicle, but will also permit the desired positive turning of the tractor vehicle relative to the trailer.

A further object of this invention is to provide a trailer stabilizer which tends to resist relative minor turning movements between the tractor vehicle and trailer, but will permit major relative turning movements between the tractor vehicle and trailer.

Another object of the invention is to provide a trailer stabilizer including cable means connecting the left sides of the trailer and tractor vehicle together and the right sides of the trailer and tractor vehicle together, the cable means being connected together to afford alternate retraction and extension on opposite sides when a predetermined cable tension is exceeded by the positive turning of the tractor vehicle relative to the trailer.

Another object of this invention is to provide a trailer stabilizer including cable means for connecting the tractor vehicle and trailer on opposite sides of the trailer hitch, and regulated frictional spool means for winding a section of the cable on one side of the trailer hitch while simultaneously unwinding the cable section on the opposite side of the trailer hitch, when a predetermined cable tension is exceeded.

Further objects and advantages of the invention will be apparent from the following description taken in conjunction with the drawings, wherein.

Figure 1:
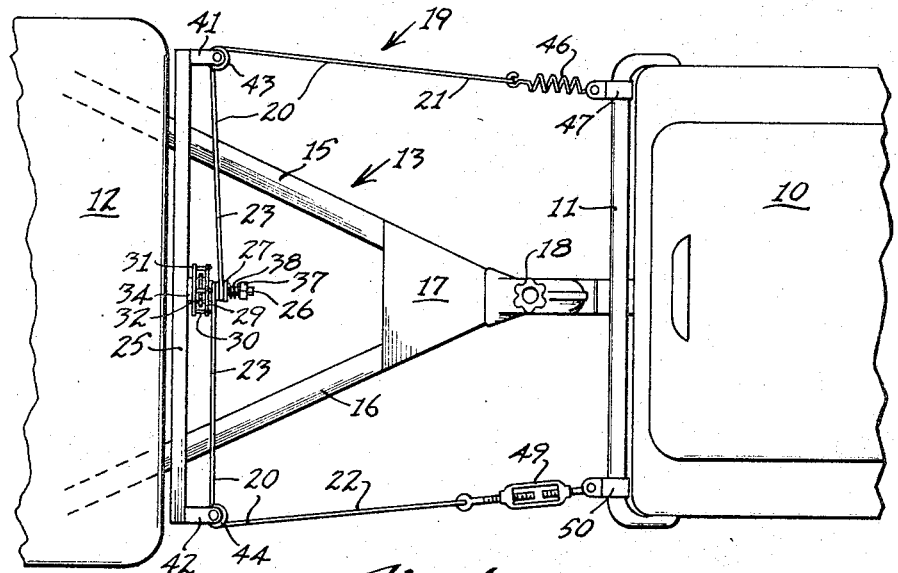
FIG. 1 is a plan view of the trailer stabilizer in operative position connecting a tractor vehicle and trailer, shown fragmentarily.
Figure 2:
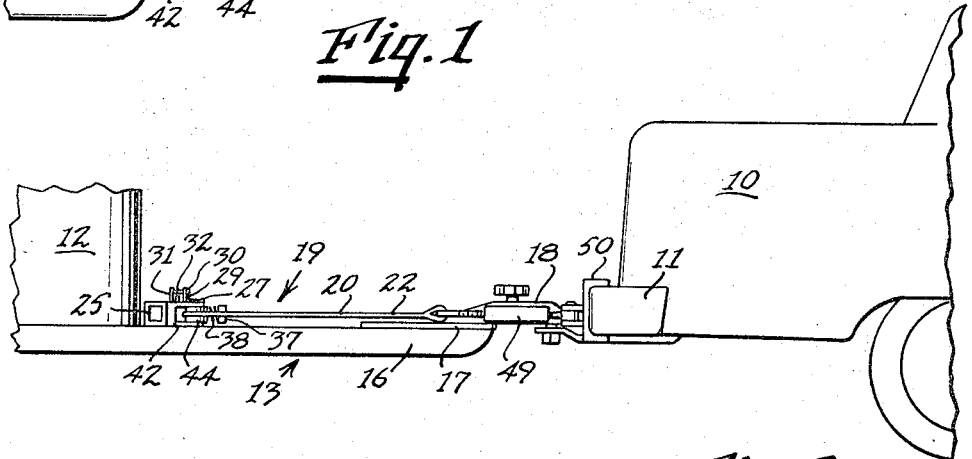
FIG. 2 is a side elevation of the invention disclosed in FIG. 1.

Referring now to the drawings in more detail, FIGS. 1 and 2 disclose a tractor vehicle, such as the passenger automobile 10, having a rear bumper 11, and a trailer vehicle or trailer 12 having a draft tongue 13 for coupling the trailer 12 to the automobile 10. The draft tongue 13 comprises a pair of converging draw bars 15 and 16 secured at the forward ends by a plate 17 which supports a conventional trailer hitch 18, shown secured to the rear bumper 11. The parts thus far described are old in the art.

The trailer stabilizer 19 made in accordance with this invention preferably includes a flexible lineal member, such as a single cable 20 having a left section or portion 21, a right section or portion 22, and a middle section or portion 23. A cable support, such as bar 25, is mounted transversely of the front of the trailer 12, such as by welding or otherwise, to the top of the draw bars 15 and 16, as shown in FIGS. 1 and 2.

Figure 4:
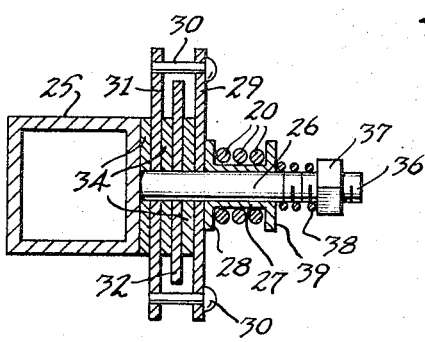
FIG. 4 is a section taken along the line 4—4 of FIG. 3.

Mounted in about the middle of the support bar 25 is a spindle 26, projecting forwardly and rotatably supporting a spool or small drum 27. Fixed to the rear flange 28 of the spool 27 is a disc 29, which in turn is fixed by bolts or pins 30 to a similar disc 31. The discs 29 and 31 are journaled for free rotation on the spindle 26, and for simultaneous rotation with the spool 27. Between the rotatable discs 29 and 31 is an intermediate disc 32 fixed to the spindle 26. The spaces between the discs 29, 32, 31 and the support bar 25 are filled with smaller discs 34 having frictional faces of abrasive material for frictional engagement with the adjacent surfaces of the discs 29, 31, 32 and the bar 25. The discs 34 are mounted for free rotatable movement on the spindle 26 also. As best disclosed in FIG. 4, the forward end of the spindle 26 is threaded at 36 to receive a nut 37 which contains a coil spring 38 between the nut 37 and the forward flange 39 of the spool 27. Thus, it will be seen in FIG. 4 that the frictional engagement between the abrasive discs 34 and the discs 29, 31 and 32, may be varied by tightening or loosening the nut 37 and thereby varying the resistance to rotation of the spool 27 on the spindle 26.

Wrapped around the spool 27 between the flanges 28 and 39 with any desired number of turns is a portion of the middle cable section 23. Mounted on each end of the support bar 25, which substantially spans the width of the trailer 12, is a left cable guide 41 and a right cable guide 42. Each cable guide 41 and 42 includes a pulley 43 and 44, respectively, freely rotatable about vertical axes. The cable 20 extends in opposite directions from the spool 27 and around the respective pulleys 43 and 44 to become the forwardly extending sections 21 and 22.

The front end of the left cable section 21 is connected to an elongated coil spring 46, which in turn is connected to a bumper coupling or clamp 47. The clamp 47 is secured to the rear bumper 11 in any conventional manner, but preferably at the left extremity of the bumper 11 spaced as far away from the trailer hitch 18 as possible. The front end of the right cable section 22 is preferably connected to a turnbuckle 49, which in turn is connected to a bumper coupling or clamp 50 identical to the clamp 47. The clamp 50 is connected to the rear bumper 11 at its right extremity and is also spaced as far away from the trailer hitch 18 as possible.

In the operation of the invention, after the trailer hitch 18 is coupled to the rear bumper 11, the clamps 47 and 50 are also coupled to the rear bumper 11, preferably at the extremities of the bumper 11 on opposite sides of the trailer hitch 18, so that the left and right cable sections 21 and 22 will be spaced as far apart as possible and as nearly parallel as possible. Before the clamps 47 and 50 are coupled to the bumper 11, the middle cable section 23 must of course be wrapped or wound around the spool 27 with the number of turns to effect the desired amount of friction between the cable 20 and the drum 27. The opposite ends of the cable 20 pass around the pulleys 43 and 44 to extend forwardly of the trailer 12 and become cable sections 21 and 22. The turnbuckle 49 must, of course, be adjusted to regulate the length of the cable 20 so that the clamps 47 and 50 may be easily secured to the bumper 11, and yet retain the desired amount of tension in the cable 20.

Although the coil spring 46 is shown in the left cable section 21, it may be incorporated in any cable section to make the cable 20 slightly yieldable, and particularly when connecting the clamps 47 and 50 to the bumper 11. The coil spring 46 will also permit sufficient yielding of the stabilizer 19 when the vehicles 10 and 12 suffer abrupt jars and jolts, such as encountered on a rocky or bumpy road, without breaking the cable 20.

Of course, one of the most important features of this invention is the adjustability of the nut 37 to obtain the right degree of frictional engagement between the spool 27 and the spindle 26 through the discs 29, 31, 32 and 34, to resist rotation for slight turning movements of brief duration of the tractor vehicle 10 relative to the trailer 12. On the other hand, the frictional engagement between the spool 27 and spindle 26 must yield to permit the spool 27 to rotate when a positive prolonged turn is made by the tractor vehicle 10, such as a definite left turn from one road to another. For example, when a definite turn to the left is made by the tractor vehicle 10, the right extremity of the bumper 11 moves away from the right extremity of the trailer 12, thereby relatively moving forward the clamp 50, turnbuckle 49 and the right cable section 22. The resultant tension in the right portion of the middle cable section 23 rotates the spool 27 in a counter-clockwise direction as viewed in FIG. 3, to unwind or pay-out more cable to the right section 22. Of course, the rotating spool 27 simultaneously winds the left portion of the middle cable section 23 to cause retraction of the left cable section 21 simultaneous with the movement of the left extremity of the bumper 11 toward the trailer 12.

Figure 3:
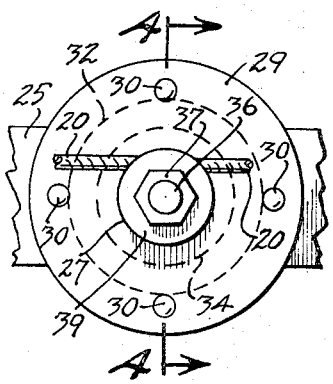
FIG. 3 is a front end elevation of the cable spool and spool mounting means.

In a similar manner, in a right turn movement by the tractor vehicle 10, the spool 27 is rotated in the opposite clockwise direction, as viewed in FIG. 3, to extend the left cable section 21 and retract the right cable section 22.

Thus, by virtue of the location of the cable sections 21 and 22 laterally spaced as far away from the center lines of the vehicles 10 and 12 and the trailer hitch 18, as well as the frictionally controlled spool 27, the trailer 12 and the tractor vehicle 10 will normally travel in tandem along a substantially straight course almost as a unitary vehicle, without swaying, whipping, tipping or other unstable movements. However, when a positive turning movement is made by the tractor vehicle relative to the trailer 12, the stabilizer 19 is adapted to yield to the turning movement without damage and without upsetting the stability of the trailer.

It will be understood that although a passenger automobile 10 has been discussed as an example of a tractor vehicle, the term "tractor vehicle" includes any type of prime mover; and the trailer vehicle 12 may be any type of trailing vehicle, such as a house trailer, van-type trailer, boat trailer or camping trailer.

Figure 5:
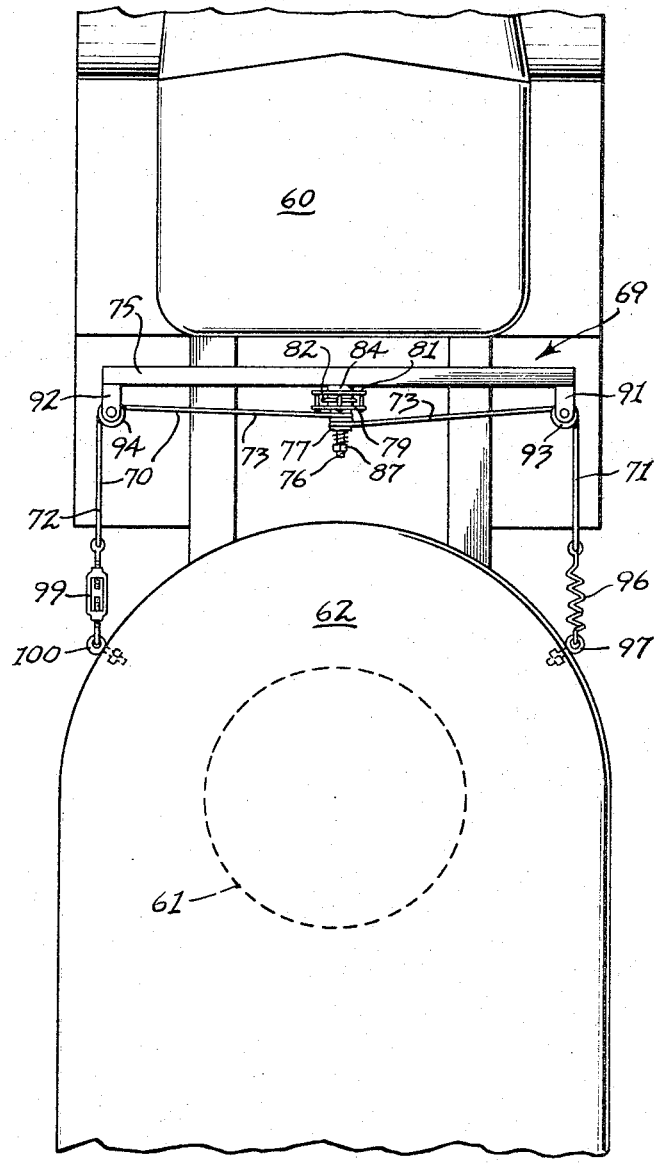
FIG. 5 is a plan view of the trailer stabilizer in operative position connecting a fifth wheel-type tractor to a trailer vehicle, shown fragmentarily.

FIG. 5 discloses a slightly modified form of the stabilizer 69, having essentially the same construction as the stabilizer 19, except that the clamps 47 and 50 have been replaced by eye bolts 97 and 100, respectively, for attachment to opposite sides of a trailer 62. Also the position of the stabilizer 69 is reversed from the position of the stabilizer 19, so that support bar 75 is fixed to and transversely of the tractor 60, having a fifth wheel 61 for coupling to the trailer 62. The remaining elements of the stabilizer 69, such as cable 70, cable sections 71, 72 and 73, spindle 76, drum 77, discs 79, 81, 82 and 84, nut 87, cable guides 91 and 82, pulleys 93 and 94, coil spring 96 and turnbuckle 98 are the same construction as their corresponding elements in the stabilizer 19. Moreover, the operation of the stabilizer 69 would be the same as the operation of the stabilizer 19. It is believed that the stabilizer 69 connecting a fifth-wheel tractor 60 to a trailer 62, as shown in FIG. 5, will substantially minimize the tendency of such tandem vehicles to "jackknife," and will substantially improve the lateral stability of the vehicles 60 and 62, without sacrificing maneuverability.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. In a trailer having left and right sides and a draft tongue and a trailer hitch extending forwardly from the middle of said trailer, a stabilizer comprising:
 (a) a cable having opposite ends and comprising a left section, a right section and a middle section,
 (b) a cable support mounted on the front portion of said trailer,
 (c) a spool about which said middle cable section is wound,
 (d) means for rotatably mounting said spool on said cable support,
 (e) a left cable guide mounted on said cable support adjacent said left side for guiding said cable from said spool to extend said left cable section forwardly,
 (f) a right cable guide mounted on said cable support adjacent said right side for guiding said cable from said spool to extend said right cable section forwardly,
 (g) first means on one end of said cable for securing said left section to the rear end of a tractor vehicle on the left side of said trailer hitch,
 (h) second means on the opposite end of said cable for securing said right section to the rear end of said tractor vehicle on the right side of said trailer hitch.

2. The invention according to claim 1 further comprising frictional means on said spool mounting means for preventing rotation of said spool until a predetermined tension is exerted in said cable.

3. The invention according to claim 2 in which said spool mounting means comprises a spindle rotatably supporting said spool, at least one friction disc mounted on said spindle between said spool and said cable support, and spring means biasing said spool toward engagement with said friction disc.

4. The invention according to claim 2 in which said spool mounting means comprises a spindle fixed to said cable support and rotatably supporting said spool, a first disc fixed to said spool and rotatably mounted on said spindle, a second disc fixedly mounted on said spindle adjacent said first disc, and spring means biasing said discs toward frictional engagement.

References Cited

UNITED STATES PATENTS

| | | | |
|---|---|---|---|
| 2,612,382 | 9/1952 | Landis | 280—456 |
| 2,756,072 | 7/1956 | Koontz. | |
| 3,116,074 | 12/1963 | Koontz. | |
| 3,305,246 | 2/1967 | Gonczy et al. | 280—446 |

LEO FRIAGLIA, *Primary Examiner.*